United States Patent
Urso et al.

(12) United States Patent (10) Patent No.: US 6,788,524 B2
(45) Date of Patent: Sep. 7, 2004

(54) DEVICE AND METHOD FOR UNIFORMLY DISTRIBUTING ELECTRODE PARTICLES

(75) Inventors: Tina Urso, East Amherst, NY (US); Dominick Frustaci, Williamsville, NY (US); Michael Guidi, West Seneca, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 0 days.

(21) Appl. No.: 10/684,077

(22) Filed: Oct. 9, 2003

(65) Prior Publication Data

US 2004/0115522 A1 Jun. 17, 2004

Related U.S. Application Data

(60) Provisional application No. 60/417,329, filed on Oct. 9, 2002.

(51) Int. Cl.[7] .............................................. H01G 9/145
(52) U.S. Cl. ...................... 361/516; 361/517; 361/519; 361/520; 361/525; 361/529
(58) Field of Search ................................. 361/516, 517, 361/519, 520, 523, 525, 528, 529, 530, 532, 535, 537, 509, 514

(56) References Cited

U.S. PATENT DOCUMENTS

| | | | |
|---|---|---|---|
| 4,915,898 A | | 4/1990 | Wolff et al. |
| 4,933,141 A | | 6/1990 | Mankins et al. |
| 5,073,405 A | | 12/1991 | Vasilow et al. |
| 5,426,561 A | * | 6/1995 | Yen et al. .................... 361/502 |
| 5,748,438 A | * | 5/1998 | Davis et al. ................. 361/504 |
| 5,907,471 A | * | 5/1999 | Patel et al. .................. 361/500 |
| 6,087,036 A | * | 7/2000 | Rouillard et al. ............. 429/66 |
| 6,396,682 B1 | * | 5/2002 | Kim et al. ................... 361/512 |
| 6,432,292 B1 | | 8/2002 | Pinto et al. |

* cited by examiner

*Primary Examiner*—Dean A. Reichard
*Assistant Examiner*—Nguyen T. Ha
(74) *Attorney, Agent, or Firm*—Michael F. Scalise (57) ABSTRACT

A drop-fill assembly and method for uniformly distributing electrode active particles onto a current collector is described. The drop-fill assembly comprises a conduit containing two or more spaced apart sifting screens. A funnel is located upstream of the sifting screens to distribute an electrode active powder into the center of the conduit with a downward velocity. The mesh of any one sifting screen is out of direct alignment with respect to the next or previous screen. The electrode active powder is poured into the funnel and distributed across the conduit's cross-section as it bounces off and passes through the misaligned sifting screens. The powder exits at the bottom of the conduit lying in a thin, uniform layer on a current collector, taking on the shape of the desired electrode due to the boundary of the conduit and pressing fixtures located above and beneath the current collector. The powder layer is then pressed on to the current collector to produce an electrode.

24 Claims, 4 Drawing Sheets

DEVICE AND METHOD FOR UNIFORMLY DISTRIBUTING ELECTRODE PARTICLES

CROSS-REFERENCE TO RELATED APPLICATION

This application claims priority from provisional application Ser. No. 60/417,329, filed Oct. 9, 2002.

BACKGROUND OF THE INVENTION

The present invention generally relates to the conversion of chemical energy to electrical energy. More particularly, the invention relates to the manufacture of electrode active structures, such as cathode electrodes, for incorporation into electrochemical cells. In building a cathode, particularly one made from a granular material, it is important that the active material is of a uniform thickness and packing density supported on the opposed contact surfaces of the intermediate current collector. Having a uniform layer of active material contacting each side of the current collector promotes improved electrical performance, especially as end-of-life (EOL) cell discharge approaches. Exemplary cathode active materials are silver vanadium oxide (SVO) and fluorinated carbon ($CF_x$).

The present invention is also applicable to anode electrodes, particularly those used in secondary or rechargeable cells where a granular active material is the anode active material. An exemplary anode material is of a granular carbonaceous material.

SUMMARY OF THE INVENTION

The present invention is directed to a drop-fill assembly and method for uniformly distributing electrode active particles onto a current collector. The drop-fill assembly comprises a conduit containing two or more spaced apart sifting screens. A funnel is located upstream of the sifting screens to distribute an electrode active powder into the center of the conduit with a downward velocity. The mesh of any one sifting screen is out of direct alignment with respect to the next or previous screen. The electrode active powder is poured into the funnel and distributed across the conduit's cross-section as it bounces off and passes through the misaligned sifting screens. The powder exits at the bottom of the conduit lying in a thin, uniform layer on a current collector, taking on the shape of the desired electrode due to the boundary of the conduit and pressing fixtures located above and beneath the current collector. A deionizer is typically used to prevent static. The powder layer is then pressed on to the current collector to produce an electrode.

These and other aspects of the present invention will become more apparent to those skilled in the art by reference to the following description and to the appended drawings.

DETAILED DESCRIPTION OF THE PREFERRED EMBODIMENTS

Figure 1A:
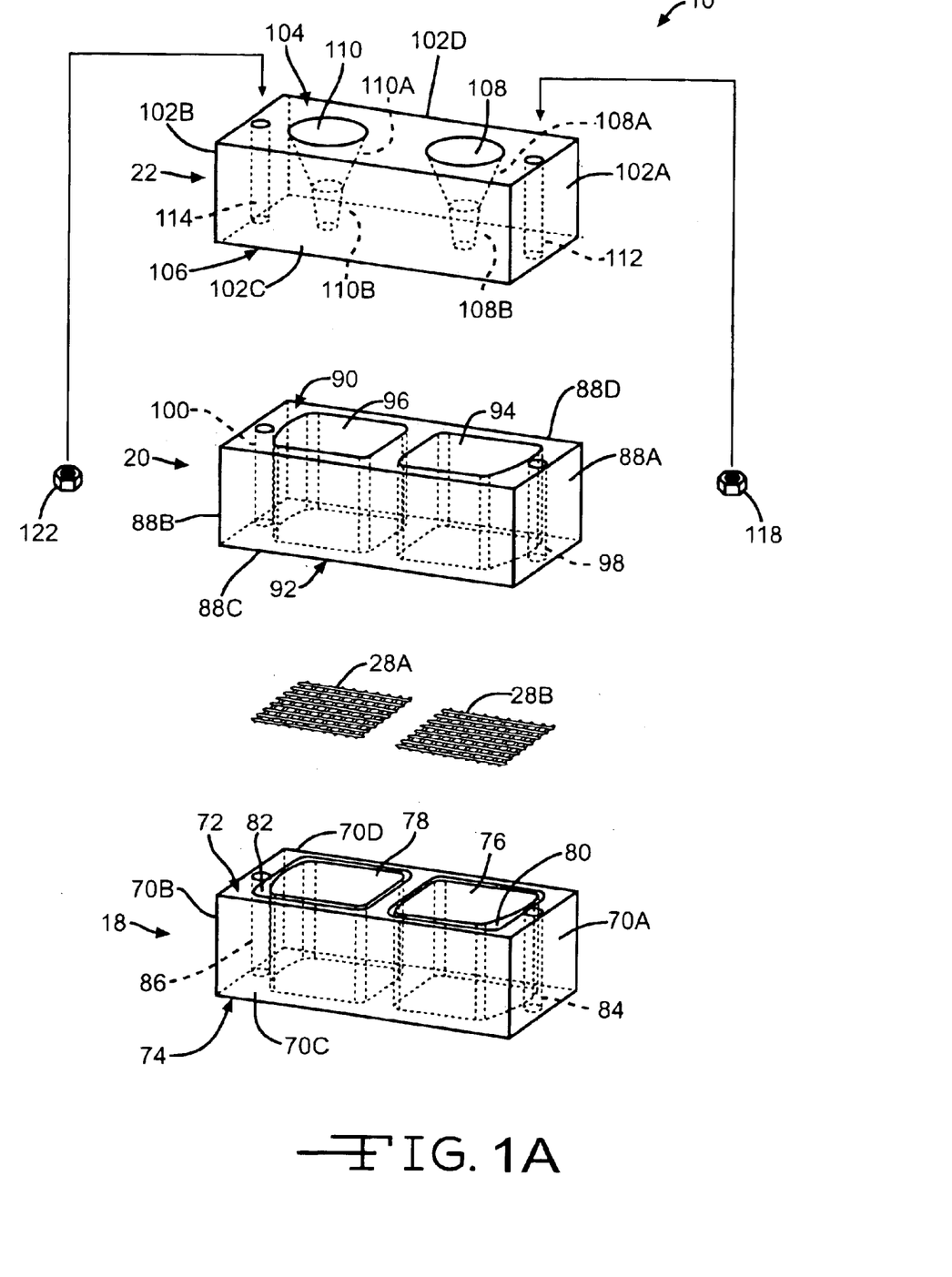
FIG. 1A is an exploded view of the upper parts of the present drop-fill assembly 10 according to the present invention and a pressing fixture assembly 12.
Figure 1B:
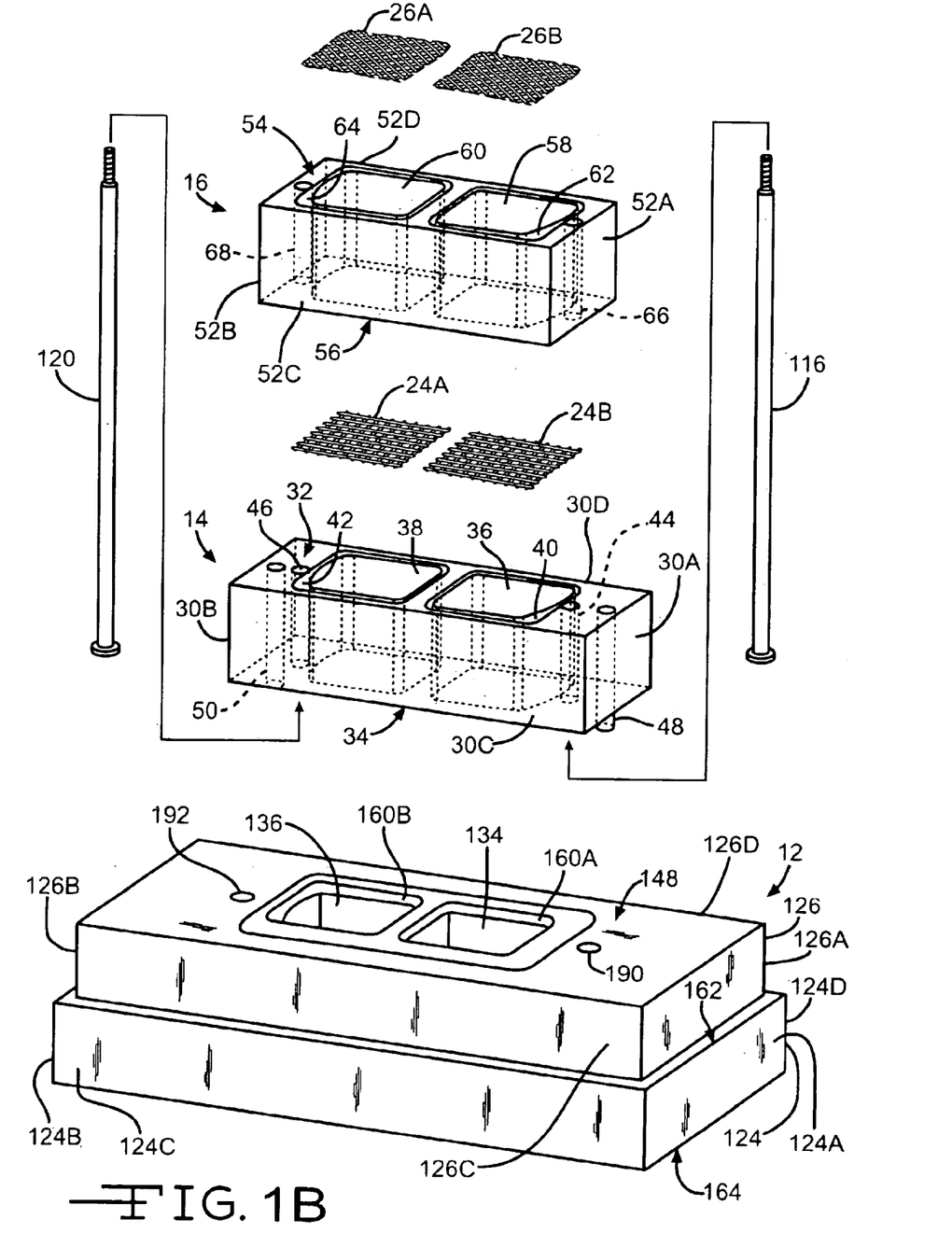
FIG. 1B is an exploded view of the lower parts of the drop-fill assembly 10.
Figure 2:
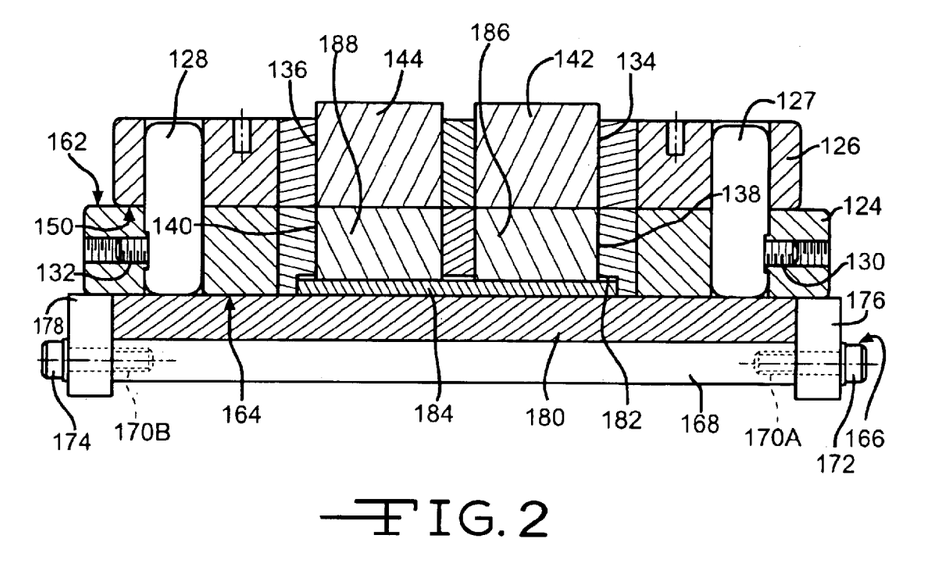
FIG. 2 is a partial cross-sectional view of the pressing fixture assembly 12 used in conjunction with the drop fill assembly 10.

Referring now to the drawings, FIGS. 1A and 1B are exploded views illustrating the main components or parts of a drop-fill assembly 10 according to the present invention. FIG. 2 illustrates the pressing fixture assembly 12 used in conjunction with the drop fill assembly. The drop-fill assembly 10 is a conduit-shaped structure supported on the pressing fixture assembly 12 and comprises a first block 14, a second block 16, a third block 18, a fourth block 20 and a fifth or upper block 22. Sifting screens 24A and 24B are captured between the first and second blocks 14, 16. Sifting screens 26A and 26B are captured between the second and third blocks 16, 18. And, sifting screens 28A and 28B are captured between the third and fourth blocks 18, 20.

The blocks 14, 16, 18, 20, and 22 are made of a polymeric material, such as of acrylics or PLEXIGLAS®, and the like. In any event, the polymeric material must not contaminate the active material during use.

The first block 14 is a rectangular shaped member comprising spaced apart right and left sidewalls 30A and 30B extending to front and back sidewalls 30C and 30D. These sidewalls extend to upper and lower parallel planar surfaces 32 and 34. Openings 36 and 38 are provided through the thickness of the first block 14 extending from the upper surface 32 to the lower surface 34. Recesses 40 and 42 are provided in the upper surface surrounding the respective openings 36, 38.

A through bore 44 extends from the upper surface 32 to the lower surface 34, intermediate the right wall 30A and the right recess 40. Similarly, a through bore 46 extends from the upper surface 32 to the lower surface 34, intermediate the left wall 30B and the left recess 42. Finally, pins 48 and 50 are provided in the first block 14. They are aligned with their longitudinal axes parallel to those of the respective through bores 44, 46. However, the lower portion of each pin 48, 50 protrude below the lower surface 34 of the block. As will be described hereinbelow, pins 48, 50 are for positioning the drop-fill assembly 10 supported on the pressing-fixture assembly 12. The right and left recesses 40, 42 are sized to receive the sifting screens 24A and 24B, respectively.

The second block 16 is a rectangular shaped member comprising spaced apart right and left sidewalls 52A and 52B extending to front and back sidewalls 52C and 52D. These sidewalls extend to parallel upper and lower planar surfaces 54 and 56. Openings 58 and 60 are provided through the thickness of the block 16 extending from the upper surface 54 to the lower surface 56. Respective recesses 62 and 64 surround the openings 58, 60.

Respective through bores 66 and 68 extend from the upper surface 54 to the lower surface 56 adjacent to the right and left openings 58, 60 and associated recesses 62, 64. When the second block 16 is positioned on the first block 14, the through bores 66, 68 are aligned with the bores 44, 46 in block 14. Also, the sifting screens 24A and 24B are positioned between the lower surface 56 of the second block 16 and the first block 14, captured in recesses 40, 42. With the second block 16 supported on the first block 14, the upper ends of the pins 48, 50 are exposed.

The third block 18 is a rectangular shaped member comprising spaced apart right and left sidewalls 70A and 70B extending to front and back sidewalls 70C and 70D. These sidewalls extend to parallel upper and lower planar surfaces 72 and 74. Openings 76 and 78 are provided through the thickness of the block 18 extending from the upper surface 72 to the lower surface 74. Respective recesses 80 and 82 surround the openings 76, 78.

Through bores 84 and 86 extend from the upper surface 72 to the lower surface 74 adjacent to the right and left openings 76, 78 and associated recesses 80, 82, respectively. When the third block 18 is positioned on the second block 16, the through bores 84, 86 are aligned with the bores 66, 68 in block 16. The sifting screens 26A and 26B are positioned between the lower surface 74 of the third block 18 and the second block 16, captured in recesses 62, 64.

The fourth block 20 is a rectangular shaped member comprising spaced apart right and left sidewalls 88A and 88B extending to front and back sidewalls 88C and 88D. These sidewalls extend to parallel upper and lower planar surfaces 90 and 92. Openings 94 and 96 are provided through the thickness of the block 20 extending from the upper surface 90 to the lower surface 92.

Through bores 98 and 100 extend from the upper surface 90 to the lower surface 92 adjacent to the right and left openings 94, 96, respectively. When the fourth block 20 is positioned on the third block, the through bores 98, 100 are aligned with the bores 84, 86 in block 18. The sifting screens 28A and 28B are positioned between the lower surface 92 of the fourth block 20 and the third block 18, captured in recesses 80, 82.

The fifth upper block 22 is a rectangular shaped member comprising spaced apart right and left sidewalls 102A and 102B extending to front and back sidewalls 102C and 102D. These sidewalls extend to parallel upper and lower planar surfaces 104 and 106. Funnel shaped openings 108 and 110 are provided through the thickness of the block 20. The funnels 108, 110 have first frusto-conical openings 108A, 110A leading from the upper surface 104 to respective second frusto-conical openings 108B, 110B exiting at the lower surface.

Respective through bores 112 and 114 extend from the upper surface 104 to the lower surface 106 adjacent to the right and left funnels 108, 110. When the fifth block 22 is positioned on the fourth block, the through bores 112, 114 are aligned with the bores 98, 100 in block 20.

The first, second, third, fourth and fifth blocks 14, 16, 18, 20 and 22 preferably each have a height as measured from their respective upper surfaces to their lower surfaces of about one inch to about three inches. In that respect, the drop-fill assembly 10 can have its various block 14, 16, 18, 20 and 22 of various heights as either unitary members or, there can be spacer blocks inserted into the column to add more height. The spacer blocks would not necessarily both support and capture a sifting screen, but are provided to add height to the overall assembly. This may be necessary, for example, when different active materials are being processed. One active material may require a higher fall height to the current collector than another to provide the desired uniform thickness layer on the opposite sides of the current collector.

An elongated bolt 116 extends through the aligned through bores 44, 66, 84, 98 and 112 in the respective blocks 14, 16, 18, 20 and 22. The bolt 116 has an enlarged head that nests in a recess in the lower surface 34 of the first block 14. A threaded portion of the bolt extends above the upper surface 104 of the fifth block 22 and receives a nut 118. Similarly, an elongated bolt 120 extends through the aligned bores 46, 68, 86, 100 and 114 in respective blocks 14, 16, 18, 20 and 22. An enlarged head of the bolt 120 nests in a recess in the first block lower surface. A threaded portion of the bolt extends above the upper surface 104 of the fifth block 22 and receives a nut 122. That way, the bolts 116 and 120 secure the blocks 14, 16, 18, 20 and 22 together with the sifting screen pairs 24A, 24B, 26A, 26B, 28A and 28B captured in their respective recesses.

The pressing fixture assembly 12 comprises a lower pressing fixture plate 124 and an upper pressing fixture plate 126. As shown in FIG. 2, the upper fixture plate 126 is supported on the lower fixture plate 124 by vertically oriented guide pins 127 and 128. The guide pins 127, 128 are press fit into openings in the lower fixture plate 124 and prevent relative lateral movement between the fixture plates 124, 126 while allowing the upper plate to be slipped off of the lower plate. Threaded members 130 and 132 are received in machined grooves in the guide pins 127, 128 to provide additional retaining structure. That way, the upper pressing fixture 126 is in a slip-fit relationship with the lower pressing fixture 124 for positioning a current collector (not shown) there between prior to the drop fill assembly 10 being supported on the pressing fixture assembly 12. As will be described in detail hereinafter, openings 134 and 136 in the upper pressing fixture plate 126 and openings 138 and 140 in the lower pressing fixture plate 124 receive an electrode active material after it has fallen through the drop-fill assembly 10. Then, the drop-fill assembly 10 is removed from the pressing fixture assembly 12 and upper plugs 142 and 144 are fitted in the respective openings 134, 136 before the pressing fixture assembly is moved to a press for producing the product electrodes.

The upper pressing fixture 126 has a generally rectangular cross-section comprising spaced apart right and left sidewalls 126A and 126D extending to and meeting with front and back walls 126C and 126D. These side walls extend to an upper surface 148 and a lower surface 150 (FIG. 3) providing the upper pressing fixture plate with a thickness dictated by the height of the walls.

Figure 3:
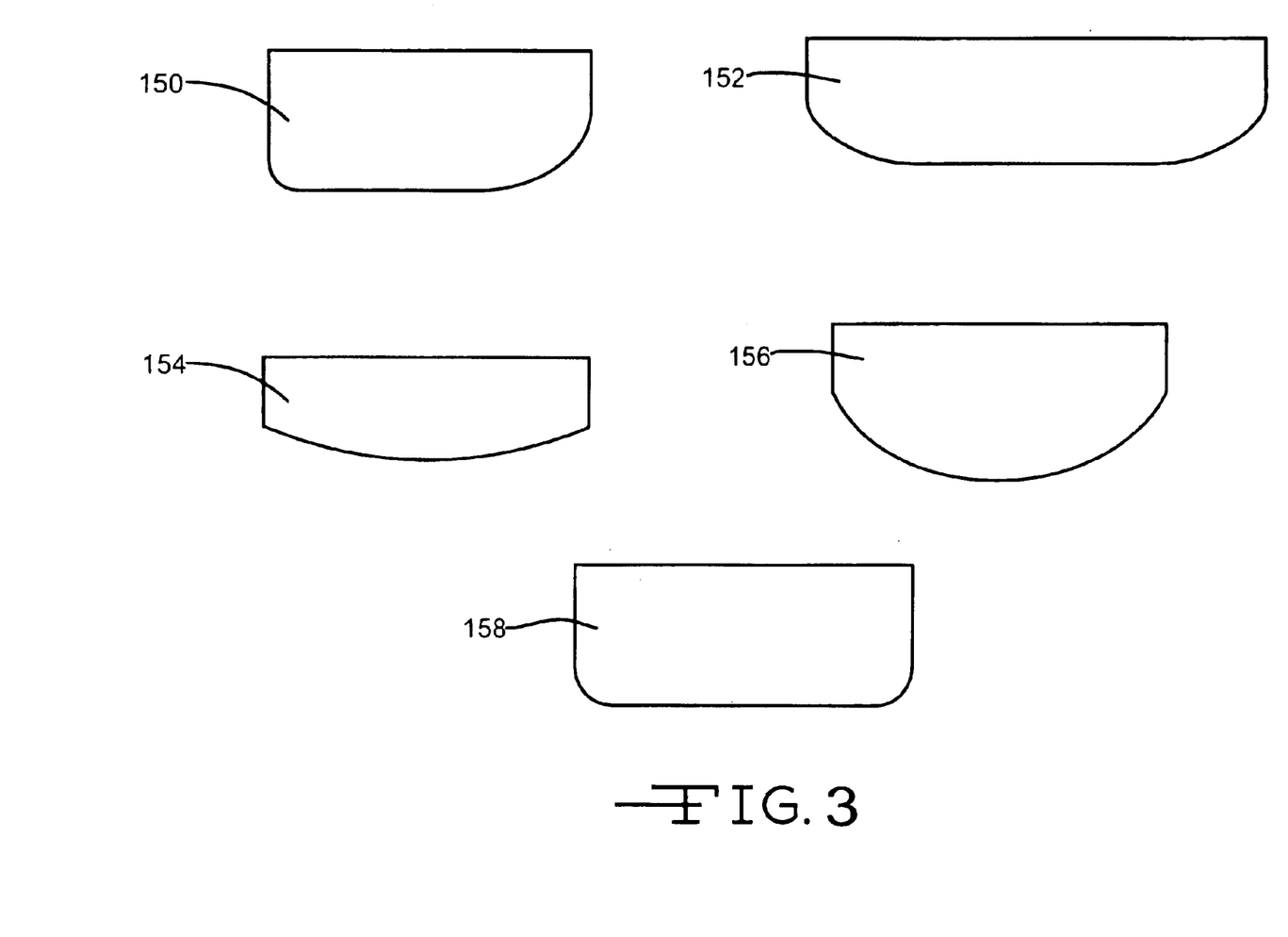
FIG. 3 is a plan view of exemplary shapes for electrodes that are producible with the present invention.

The opening pairs 134, 136 and 138, 140 are of a similar shape, although that is not necessary. However, the shape of the openings dictate the shape of the product electrode. In FIG. 1B, the openings 134, 136 are of a generally square cross-sectional shape in plan view to provide a similarly configured product electrodes. FIG. 3 shows other exemplary electrode shapes for the openings in the lower and upper pressing fixture plates 124, 126. Those include generally rectangular with a radiused edge 150, elongated generally rectangular with two radiused edges 152, generally rectangular with curved sides 154 and 156 of different radii, and generally rectangular with curved edges 158. Those skilled in the art will understand that the openings can have a myriad of other shapes, only limited by the configuration of a cell into which the resulting electrode is to be used.

Bevels 160A and 160B surround the side-by-side openings 134, 136. The bevels help funnel the electrode active material into the openings 134, 136 centered substantially at an equal distance between the right and left sidewalls 126A, 126B and the front and back sidewalls 126C, 126D of the upper pressing fixture plate 126.

The lower pressing fixture plate 124 is somewhat larger than the upper pressing fixture plate 126 in rectangular cross-section and comprises spaced apart right and left sidewalls 124A and 124B extending to and meeting with front and back walls 124C and 124D. These sidewalls extend to an upper surface 162 and a lower surface 164 providing the fixture plate with a thickness between the surfaces.

As shown in FIG. 2, the pressing fixture assembly 12 includes a set-up cradle 166 that supports the lower pressing fixture plate 124. The cradle 166 comprises a base plate 168 having threaded openings 170A, 170B in its opposed sides. The openings 170A, 170B receive screws 172, 174.

Upstanding legs 176 and 178 are movably secured to the base plate 168 by the screws 172, 174. While not shown in the drawing, the legs are provided with grooves so that upon loosening the screws, the base plate is vertically adjustable relative to the legs.

A spacer plate 180 rests on top of the base plate 168 and is vertically movable up and down relative to the legs 176, 178 along with the base plate. The lower surface of the lower pressing fixture plate 124 has a cut-out 182 centered in communication with the openings 138, 140. An adjusting plate 184 is nested in the cut-out 182. The adjusting plate 184 supports lower plugs 186 and 188 housed in respective openings 138, 140 on the lower pressing fixture plate 124. The height of the adjusting plate 184 together with the height of the lower plugs 186, 188 is substantially equal to the depth of the openings 138, 140. That way, when the screws 172, 174 are loosened and base plate 168 is moved relative to the legs 176, 178, the spacer plate 180, adjusting plate 184 and supported plugs 186, 188 are moved relative to the upper surface 162 of the lower pressing fixture plate 124. This movement is used to regulate the resulting amount of electrode active material that fills in below the current collector (not shown) captured between the pressing fixture plates 124, 126.

In use, an active material in a particulate form is loaded into the funnels 108, 110. The funnels are sized so that about 0.1 cc/sec. to about 1.0 cc/sec., more preferably about 0.3 cc/sec. to about 0.5 cc/sec., of active material exits the second frusto-conical openings 108B, 110B. That way, the funnels serve to meter the rate of descent of the active particles through the assembly 10.

The active material from the funnels first falls through the openings 94, 96 in the fourth block 20 and impinges on the screens 28A, 28B. As the active material bounces off of and passes through the screens, it tends to substantially occupy the entire area of the openings 76, 78 in block 18 below the screens.

The active material continues its free fall through the openings 76, 78 in third block 18 to then impinge on sifting screens 26A, 26B. An important aspect of the present invention is that the mesh of the sifting screens 26A, 26B is oriented at from about a 10° to about an 80° angle, more preferably at about a 45° angle out of direct alignment, with respect to the mesh of the upper sifting screens 28A, 28B. That is, each of the screen 28A, 28b comprises warp and weft strands that are aligned at about 90° with respect to each other. Then, the warp and weft strands of sifting screens 26A, 26B are preferably aligned at about a 45° angle with respect to the warp and weft strands of screens 28A, 28B. This pattern is continued throughout the entire assembly so that the orientations of the warp and weft strands of any one sifting screen are angled with respect to those of the sifting screens immediately above and below it.

The active material continues its free fall through the screens 26A, 26B and the openings 58, 60 of the second block 16 where they once again impinge upon sifting screens 24A, 24B. Again, these screens are angled at from about a 10° to about an 80°, more preferably at about a 45° angle, with respect to the mesh of the screens 26A, 26B above them. By now, the free falling active material substantially occupies the entire area of the openings 36, 38 in a uniform distribution pattern as it falls through the first block 14.

Previously, electrode current collectors have been captured between the lower and upper pressing fixture plates 124, 126 centered with respect to the respective right and left opening pairs 134, 138 and 136, 140. The current collectors can be screens, perforated foils or of an expanded mesh. In any event, the current collectors have from about 2% to about 80% open area, more preferably form about 40% to about 75% open area. This is sufficient to allow some of the active material to fall through the current collectors and fill in the open area above the lower plugs 186, 188 in the lower pressing fixture plates 124. The remaining active material accumulates in the openings 134, 136 above the current collectors.

In an alternate embodiment, about one-half of the active material needed for an electrode is first loaded into the open area of the openings above the lower plugs before the current collectors are captured between the pressing fixture plate 124, 126. This is generally going to be the case for current collectors that are not perforated or that do not have a sufficient amount of open area to ensure a sufficient amount of active material is pressed onto the lower side of the current collector.

Then, the drop-fill assembly is supported on the pressing fixture assembly 12 with the pegs 48, 50 received in the respective openings 190, 192. This serves to position the various blocks 14, 16, 18, 20 and 22 and the associated sifting screen pairs aligned with the current collectors. The remaining one-half of the required active material for the electrode build is loaded into the funnels 108, 110 and allowed to fall through the blocks and sifting screens to cover the other side of the current collectors with a uniform thickness layer having a generally even particle size distribution.

While not shown in the drawings, after the active material is filled onto the opposite sides of the current collectors as uniform thickness layers, the drop fill assembly 10 is removed from the pressing fixture assembly 12. Plugs 142 and 144 are inserted into the respective openings 134, 136, and the pressing fixture assembly 12 is moved to a press. The press subjects the active material to a force of about one ton to about 150 tons to press contact the active material to the opposite sides of the current collectors. For example, SVO is typically pressed at a force of about 16 to 150 tons while $CF_x$ is pressed at about one to 10 tons. That way, the pressing force serves to lock the active material together through the openings in the intermediate current collectors.

While the present drop-fill assembly 10 has been described as having three pairs of sifting screens, that is not necessary. Instead, there can be two pairs or more than three pairs of sifting screen in the assembly. Also, the sifting screens and associated block openings need not be provided as side-by-side pairs. The present assembly 10 can have a single opening in each block, or there can be more than two openings provided in a readily usable pattern.

As previously described, a deionizer device can be used with the drop-fill assembly 10 to prevent static charges from building up as the active material falls through the tower of blocks and sifting screens. Also, it may be desirable to have a vibration device (not shown) associated with the assembly. This would help ensure that the active material does not accumulate at a sifting screen, which could eventually clog the assembly. A vibration device would also help provide a uniform layer of active material on the current collector.

The drop-fill assembly 10 of the present invention is useful for constructing cells of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred metal comprises lithium. An alternate negative electrode comprises a lithium alloy, such as lithium-aluminum alloy. The greater the amounts of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) that are capable of reversibly retaining the lithium species is preferred for the anode material. A "hairy carbon" material is particularly preferred due to its relatively high lithium-retention capacity. "Hairy carbon" is a material described in U.S. Pat. No. 5,443,928 to Takeuchi et al. This patent is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by the drop-fill assembly 10 of the present invention or by casting, pressing, rolling or otherwise contacting the admixture thereto.

By way of illustration, and in no way intended to be limiting, exemplary cathode active materials comprise silver vanadium oxide having the general formula $Ag_xV_2O_y$ (SVO) in any one of its many phases, i.e. β-phase silver vanadium oxide having x=0.35 and y=5.18, γ-phase silver vanadium oxide having x=0.80 and y=5.4 and ε-phase silver vanadium oxide having x=1.0 and y=5.5, and combination and mixtures of phases thereof. For a more detailed description of silver vanadium oxide materials, reference is made to U.S. Pat. No. 4,310,609 to Liang et al., U.S. Pat. No. 5,389,472 to Takeuchi et al., U.S. Pat. No. 5,498,494 to Takeuchi et al. and U.S. Pat. No. 5,695,892 to Leising et al., all of which are assigned to the assignee of the present invention and incorporated herein by reference.

Another preferred metal oxide has the general formula $Cu_xAg_yV_2O_z$, (CSVO). This cathode active material about $0.01 \leq x \leq 1.0$, about $0.01 \leq y \leq 1.0$ and about $5.01 \leq z \leq 6.5$. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference.

Additional cathode active materials for a primary cell include manganese dioxide, cobalt oxide, nickel oxide, copper vanadium oxide, titanium disulfide, copper oxide, copper sulfide, iron sulfide, iron disulfide, fluorinated carbon, and mixtures thereof.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium metal comprising the positive electrode is intercalated into the carbonaceous negative electrode by applying an externally generated electrical potential to recharge the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging from about 0.1 to about 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside the cell. Lithiated carbon tends to react when contacted by air or water.

The above described cathode active materials, whether of a primary or a secondary chemistry, are formed into an electrode body for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents when mixed with the above listed active materials. The positive electrode of both a primary and a secondary cell further comprises a binder material that is preferably a fluoro-resin powder such as powdered polytetrafluoroethylene (PTFE) or powdered polyvinylidene fluoride (PVDF). More specifically, a preferred cathode active material for a primary cell comprises SVO in any one of its many phases, or mixtures thereof, and/or CSVO mixed with a binder material and a conductive diluent. A preferred cathode active material for a secondary cell comprises lithium cobalt oxide mixed with a binder material and a conductive diluent.

In that respect, a preferred positive electrode active admixture according to the present invention comprises from about 80% to 99%, by weight, of a cathode active material comprising either one or both of the SVO and CSVO materials for a primary cell or lithium cobalt oxide for a secondary cell mixed with a suitable binder, a conductive diluent and at least one of the above carbonate compounds. The resulting blended active mixture is formed into a freestanding electrode structure in the above described drop-fill assembly 10. Electrodes prepared as described above may be in the form of one or more plates operatively associated with at least one or more plates of a counter electrode, or in the form of a strip wound with a corresponding strip of the counter electrode in a structure similar to a "jellyroll".

In order to prevent internal short circuit conditions, the positive electrode is separated from the negative electrode by a suitable separator material. The separator is of electrically insulative material, and the separator material also is chemically unreactive with the negative and positive electrode materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet that is placed between the negative and positive electrodes and in a manner preventing physical contact there between. Such is the case when the negative electrode is folded in a serpentine-like structure with a plurality of positive electrode plates disposed between the folds and received in a cell casing or when the electrode combination is rolled or otherwise formed into a cylindrical "jellyroll" configuration.

The primary and secondary electrochemical cells of the present invention further include a nonaqueous, ionically conductive electrolyte. The electrolyte serves as a medium for migration of ions between the negative and the positive electrodes during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent system.

For both a primary and a secondary cell, the electrolyte preferably comprises an alkali metal salt dissolved in a mixture of aprotic organic solvents comprising a low viscosity solvent including organic esters, ethers, dialkyl carbonates, and mixtures thereof, and a high permittivity solvent including cyclic carbonates, cyclic esters, cyclic amides, and mixtures thereof. Low viscosity solvents include tetrahydrofuran (THF), diisopropylether, methyl acetate (MA), diglyme; triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethyl methyl carbonate (EMC), methyl propyl carbonate (MPC), ethyl propyl carbonate (EPC), and mixtures thereof. High ettivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

The preferred electrolyte for both a primary and a secondary cell comprises a lithium salts selected from the group of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof. Suitable salt concentrations typically range between about 0.8 to 1.5 molar.

In the present invention, the preferred primary electrochemical cell has a negative electrode of lithium metal and a positive electrode of silver vanadium oxide contacted to one side of a current collector and $CF_x$ contacted to the other. For more detail description regarding this type of cathode construction, reference is made to U.S. Pat. No. 6,551,747 to Gan, which is assigned to the assignee of the present invention and incorporated herein by reference. For this primary couple, the preferred activating electrolyte is 1.0M to 1.4M $LiAsF_6$ dissolved in a 50/50 mixture, by volume, of propylene carbonate and 1,2-dimethoxyethane. A preferred electrolyte for a secondary cell of a carbon/$LiCoO_2$ couple comprises a solvent mixture of EC:DMC:EMC:DEC.

The assembly of the primary and secondary cells described herein is either in the form of a wound element configuration or of a multi-plate design with the negative electrode on the outside to make electrical contact with the cell case in a case-negative configuration. The cell assembly is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

A cell header comprising a first hole to accommodate a glass-to-metal seal/terminal pin feedthrough and a second hole for electrolyte filling are provided to close the casing. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of either the exemplary primary or secondary cell of the present invention. As is well known to those skilled in the art, the exemplary primary and secondary electrochemical systems of the present invention can also be constructed in case-positive configurations.

It is appreciated that various modifications to the present inventive concepts described herein may be apparent to those of ordinary skill in the art without departing from the spirit and scope of the present invention as defined by the herein appended claims.

What is claimed is:

1. An assembly for providing an electrode for an electrical energy storage device, the assembly comprising:

a) a support for a current collector, the support comprising upper and lower support plates having aligned openings, wherein the upper and lower support plates are manipulatable with respect to each other to capture a current collector there between intermediate the aligned openings;

b) a conduit having a surrounding sidewall extending along a longitudinal axis to opposed first and second conduit ends, the conduit being in flow communication with the platform openings and the current collector with the first conduit end adjacent to the current collector and the second conduit end spaced vertically above the first conduit end; and c) at least one planar sifting screen supported by the conduit generally normal to the longitudinal axis thereof and spaced vertically above the current collector and the first conduit end, wherein the conduit provides for an electrode active material introduced into the second conduit end to fall through the conduit, through the at least one sifting screen and onto the current collector as a generally uniform layer thereon.

2. The assembly of claim 1 wherein the lower support plate includes a lower plug that is vertically adjustable with respect to an upper support surface of the lower support plate so that when a current collector is captured between the upper and lower support plates, the space below the current collector for electrode active material is adjustable to a desired thickness.

3. The assembly of claim 1 wherein the conduit is removable from the support and the opening in the upper support plate is capable of receiving a plug resting on the electrode active material filled in on top of the current collector for pressing the active material to both sides of the current collector.

4. The assembly of claim 1 wherein the conduit supports at least two planar sifting screens spaced apart from each other between the first and second conduit ends.

5. The assembly of claim 4 wherein the sifting screens each comprise warp and weft strands oriented generally perpendicular to each other.

6. The assembly of claim 5 wherein the warp and weft strands of a first one of the sifting screens are oriented from about 10° to about 80° out of direct alignment with respect to the warp and weft strands of a second one of the sifting screens.

7. The assembly of claim 1 wherein the second end of the conduit comprises a funnel-shaped opening.

8. The assembly of claim 7 wherein the funnel-shaped opening restricts the flow of electrode active material through the conduit to a rate of about 0.1 cc/sec. to about 1.0 cc/sec.

9. A method for providing an electrode for an electrical energy storage device, comprising the steps of:

a) providing a support for a current collector, the support comprising upper and lower support plates having aligned openings;

b) positioning the current collector captured between the upper and lower support plates intermediate the aligned openings;

c) providing a conduit having a surrounding sidewall extending along a longitudinal axis to opposed first and second conduit ends;

d) positioning the conduit in flow communication with the platform openings and the current collector with the first conduit end adjacent to the current collector and the second conduit end spaced vertically above the first conduit end, wherein the conduit includes at least one planar sifting screen oriented normal to the longitudinal axis of the conduit and spaced vertically above the current collector and the first conduit end; and e) introducing an electrode active material into the second conduit end and letting it fall through the conduit, through the at least one sifting screen and onto the current collector as a generally uniform layer thereon.

10. The method of claim 9 including providing the conduit supporting at least two planar sifting screens spaced apart from each other between the first and second conduit ends.

11. The method of claim 10 including separating the two sifting screens by a distance of about one to three inches.

12. The method of claim 10 including providing the sifting screens each comprising warp and weft strands oriented generally perpendicular to each other.

13. The method of claim 12 including orienting the warp and weft strands of a first one of the sifting screens from about 10° to about 80° out of direct alignment with respect to the warp and weft strands of a second one of the sifting screens.

14. The method of claim 9 including providing the second end of the conduit comprises a funnel-shaped opening.

15. The method of claim 14 including having the funnel-shaped opening restricting the flow of electrode active material through the conduit to a rate of about 0.1 cc/sec. to about 1.0 cc/sec.

16. The method of claim 9 including providing the electrode active material as either a cathode active material for a primary cell or a secondary cell or an anode active material for a secondary cell.

17. The method of claim 9 including providing the current collector as either perforated or unperforated.

18. The method of claim 9 including providing the current collector having an open area of about 2% to about 80%.

19. The method of claim 9 including providing the current collector being perforated so that a portion of the electrode active material introduced into the conduit falls through the current collector to the opening in the lower support plate.

20. The method of claim 9 including removing the conduit from being in flow communication with the platform openings and then subjecting the electrode active material to a pressing force to contact it to the current collector.

21. The method of claim 9 including selecting the electrode active material from the group consisting of silver vanadium oxide, copper silver vanadium oxide, manganese dioxide, cobalt oxide, nickel oxide, copper vanadium oxide, titanium disulfide, copper oxide, copper sulfide, iron sulfide, iron disulfide, fluorinated carbon, $LiNiO_2$, $LiMn_2O_4$, $LiCoO_2$, $LiCo_{0.92}Sn_{0.08}O_2$ and $LiCo_{1-x}Ni_xO_2$, and mixtures thereof.

22. An assembly for providing an electrode for an electrical energy storage device, the assembly comprising:

a) a support for a current collector;

b) a conduit having a surrounding sidewall extending to opposed first and second conduit ends, wherein the first conduit end is adjacent to the support and the current collector and the second conduit end is spaced above the first conduit end; and c) at least one sifting screen supported by the conduit, the sifting screen spaced above the current collector and the first conduit end, wherein the conduit provides for an electrode active material introduced into the second conduit end to fall through the conduit, through the at least one sifting screen and onto the current collector as a generally uniform layer thereon.

23. The assembly of claim 22 wherein the conduit supports at least two sifting screens spaced apart from each other between the first and second conduit ends.

24. The assembly of claim 22 wherein the second conduit end comprises a funnel-shaped opening.

* * * * *